(12) United States Patent
Cashin et al.

(10) Patent No.: US 8,836,910 B2
(45) Date of Patent: Sep. 16, 2014

(54) LIGHT AND SOUND MONITOR

(76) Inventors: James A. Cashin, San Luis Obispo, CA (US); Harold Mark Hallikainen, Santa Maria, CA (US)

(*) Notice: Subject to any disclaimer, the term of this patent is extended or adjusted under 35 U.S.C. 154(b) by 323 days.

(21) Appl. No.: 13/488,422

(22) Filed: Jun. 4, 2012

(65) Prior Publication Data

US 2013/0321645 A1  Dec. 5, 2013

(51) Int. Cl.
*G01J 3/46*  (2006.01)

(52) U.S. Cl.
USPC .............. 352/3; 352/12; 352/40; 353/121; 353/122; 348/135

(58) Field of Classification Search
CPC ............ G01J 3/46; G01J 3/501; G01J 3/506; H04N 17/045; G09G 2320/02; G09G 2320/066; G09G 2320/04
USPC ............... 353/15, 69, 28, 121, 122; 348/135; 356/121, 213, 218; 352/1, 3, 5, 12, 14, 352/38, 40, 41
See application file for complete search history.

(56) References Cited

U.S. PATENT DOCUMENTS

| | | | | |
|---|---|---|---|---|
| 5,798,818 A * | 8/1998 | Derderian et al. | ............... | 352/31 |
| 7,011,413 B2 * | 3/2006 | Wada | ............... | 353/31 |
| 7,233,707 B2 * | 6/2007 | Matsuda et al. | ............... | 382/275 |
| 7,333,154 B2 * | 2/2008 | Dean et al. | ............... | 348/722 |
| 7,339,596 B2 * | 3/2008 | Tajima | ............... | 345/600 |
| 7,345,692 B2 * | 3/2008 | Wada | ............... | 345/600 |
| 7,517,089 B2 * | 4/2009 | Matsuda | ............... | 353/69 |
| 7,768,527 B2 * | 8/2010 | Zhang et al. | ............... | 345/619 |
| 7,905,606 B2 * | 3/2011 | Bullock | ............... | 353/69 |
| 2004/0150835 A1 * | 8/2004 | Frick et al. | ............... | 356/601 |
| 2005/0001991 A1 * | 1/2005 | Ulichney et al. | ............... | 353/69 |
| 2008/0062164 A1 * | 3/2008 | Bassi et al. | ............... | 345/214 |
| 2014/0126728 A1 * | 5/2014 | Van Der Schaar et al. | ..... | 381/56 |

* cited by examiner

*Primary Examiner* — William C Dowling
(74) *Attorney, Agent, or Firm* — Andra M. Vaccaro

(57) ABSTRACT

The present invention comprises a light and sound sensor system and method for repetitively measuring the luminance, chromaticity, sound, and infrared illumination in a theater to detect any changes thereto so that the images being viewed on the screen and the sound in the theater can be kept at their optimal values. In addition, in a preferred embodiment of the present invention, the system has an audio and video synchronization capability. By monitoring the audio and visual signals in real time, the exact time relationship between the signals is detected to determine whether they are properly synchronized.

16 Claims, 2 Drawing Sheets

LIGHT AND SOUND MONITOR

BACKGROUND OF THE INVENTION

1. Field of the Invention

The invention relates to diagnostic devices used to measure luminance, chromaticity and sound. Specifically, this invention relates to local and remote monitoring of luminance, chromaticity, sound, infrared illumination and/or synchronization of the image and sound thereof.

2. Background of the Invention

Presently, there are devices and methods that when individually combined may be used to measure and adjust the luminance levels on a display surface, such as, but not limited to, a cinema screen, and to measure the sound quality within the same display area.

One device that measures luminance (brightness of the screen image), low or imperceptible variations in the luminance of a display surface such as a movie screen (otherwise known as "flicker"), and the amount of horizontal and vertical motion of an image that is being displayed on the screen (known respectively as "weave" and "jump" of the image) is set forth in U.S. Pat. No. 5,818,597 issued to Ultra Stereo Labs, Inc. entitled PROJECTION SYSTEM ANALYZER. However, in order to monitor the accompanying sound within the same display area such as a theater or auditorium, a microphone also must be mounted somewhere within the display area and the signal therefrom processed to determine whether the sound in the display area meets standard industry levels, such as those created by the Society of Motion Picture and Television Engineers ("SMPTE"), or levels desired by the user.

With the transition of theaters from film to digital media, some theaters have instituted Network Operations Centers (hereafter, "NOC") from which the equipment in each theater in the network can be monitored and controlled from one or more locations. Some theaters may use commercially available internet cameras to monitor the sound and luminance within a theater. For example, an internet camera, which is capable of transmitting sound as well as images, may be aimed at a theater screen to monitor the sound and the images as they are seen and heard by an audience. At the same time that the images are being seen and the audio is being heard by the audience, they also may be transmitted by the camera to the NOC via the internet. NOC personnel then may monitor the audiovisual feeds from the camera(s) to determine whether the audiovisual equipment in the theater is working properly and to ensure that there has been no degradation in the audiovisual display in the theater. This method of monitoring the screen luminance and the sound within the theater is subjective as it is dependent upon the knowledge and skill of the person monitoring the feed from each camera.

Further, when using internet cameras, it may be difficult to fine-tune the theater projector and sound equipment (including each individual speaker) to ensure that they are working at optimal values. By way of example and not limitation, some internet cameras may have wide angle lenses which are not suitable for making suitable luminance measurements. Also, because some internet cameras have built-in automatic gain control circuitry to optimize the picture and the sound transmitted therefrom, it may be difficult to obtain accurate readings of what is actually being viewed and heard from within the theater. Thus, it may be difficult to meet the uniform professional standards for luminance and sound solely using internet cameras. Further, because the internet camera signals may be transmitting their output to the NOC over the internet, there may be a risk that the camera signals may be intercepted by unauthorized persons, so that there is a possibility of piracy of the images and sound being transmitted by the camera.

Some theaters may use professional light measurement instruments, wherein a technician uses a professional spotmeter to measure the luminance on a precise area on a screen. During the measurement process, the projection equipment may be continuously adjusted until the optimal luminance on the screen being tested is achieved. A similar method may be performed by a technician using professional sound meters that take sound measurements in order to determine whether the sound system and each of the speakers located within a theater are operating within the normal optimal operating range. Using this process to monitor and measure the luminance and sound in a theater requires the presence of a technician who goes from theater to theater to constantly measure and monitor the equipment.

Thus, there is need for a device that can remotely monitor the luminance, chromaticity and infrared display surface illumination and the sound heard within the display area to detect any changes thereto so as to determine when and whether the equipment is operating properly so to decide whether maintenance of the display and sound equipment is required. This would be of great use in the art, as it would conserve resources by requiring less technician time to monitor and maintain the sound and video quality. It also would be of great benefit as it would give rapid notification of any changes or degradation in the outputs of the sound and projection equipment so that they can be quickly and precisely addressed and corrected. In addition, it also would be of great use in the art if the device also could provide remote synchronization verification to ensure that the video signal is synchronized with its audio signal. It further would be of great advantage to the art if the monitoring equipment also could detect whether any closed captioning, assisted listening and visual narrative (e.g. Americans with Disabilities Act ("ADA")) equipment is transmitting properly. Further, it would be of great benefit to the art if the monitoring and testing equipment were located within a single package that could be easily mounted in a location that is unobtrusive and essentially tamperproof.

SUMMARY OF THE INVENTION

The present invention comprises a light and sound sensor (LSS) system and method for repetitively measuring the luminance, chromaticity, sound, and infrared illumination of a display surface, such as, but not limited to, a screen in a theater or other viewing area, to detect any changes in value or failures of the projection equipment and/or sound system equipment so that the images being viewed on the display surface and the sound in the viewing area can be kept at optimal values and/or meet industry standards for luminance, chromaticity, infrared reflection and/or sound. In addition, in a preferred embodiment of the present invention, the system also is capable of determining whether the audio and video signals are synchronized. By testing the audio and visual outputs of the projector and sound system in real time, the exact time relationship between the audio and video outputs may be obtained and any time difference between them computed to determine whether the audio and video signals are properly synchronized.

In a preferred embodiment of the present invention, the system comprises a lens that is focused at a predetermined location on the display surface. In a preferred embodiment, a high power light source such as one or more high power narrow beam LEDS shoot light through the lens to focus and aim the system at one or more locations on the display area. In a preferred embodiment, the optics also are designed to mimic the standard light acceptance angle of professional spotmeters and industry parameters. Alternatively, the system of the present invention may be designed so that it can measure the luminance and chromaticity of the display surface according to standards set by the user. The system further comprises at least one color sensor that measures both the light levels and the color quality of a display surface. In a preferred embodiment, the color sensor is mounted so that it is in the same plane as the focusing light source and is integrated with an analog to digital converter that feeds the converted signal into a microcontroller. From the measurements taken by the system and calibrated by the microcontroller, any degradation in the video signal or failures of the video projection equipment can be determined.

In an embodiment of the present invention, the device also comprises an infrared sensor with an integrated analog to digital converter. The infrared sensor measures the infrared levels reflected off a display surface from an infrared emitter and the measurement then is converted into a digital signal by its integrated analog to digital converter and fed into the microcontroller to determine if the infrared transmission device is working according to its parameters. Being able to determine the infrared levels reflected off the display surface is important as assisted listening, visual narratives and closed captions are often transmitted into a display area using infrared signals reflected off the display surface.

As an alternative to measuring the gross infrared illumination, the device can make a more detailed analysis of the infrared illumination of the screen. The infrared photodetector (typically, but not limited to, a photodiode or any other device or sensor that can sense infrared illumination) drives analog or digital circuitry to determine the average level of the infrared illumination and what frequencies are modulating the infrared illumination. The device further demodulates the signals that are modulating the infrared illumination and analyzes the demodulated signals. The results of such analysis would be sent to the user or automatic monitoring equipment by the microcontroller.

In the present invention, the device may also comprise an omnidirectional microphone that measures the sound pressure levels (SPL) in the display area. In an embodiment of the present invention, the microphone is mounted so that it protrudes past the optics so that there is no distortion of the microphone's omnidirectional pattern due to reflections from the optics. In a preferred embodiment, the audio signal from the microphone is passed through a "C" weighting filter. The audio signal is split so that it is fed directly into the microcontroller in real time where it is compared to the video signal to ascertain whether there is any time difference between the audio and video signals to determine whether the video and audio signals are properly synchronized. At the same time, the filtered audio signal is further processed by the microcontroller and calibrated so any readings for the resultant audio signal can be compared to readings detected by sound pressure level (SPL) meters commonly used by technicians to set up audio equipment. In this manner, any degradation or any failures of the sound equipment can be determined. Also, in a preferred embodiment, an Ethernet port is connected to the microcontroller so that it can send the acquired luminance, chromaticity, sound pressure level, and audio/video synchronization data to the NOC or to a technician via the internet. However, any method of sending the signal may be used. If any degradations or failures in the equipment are detected using the device of the present invention, a technician or automatic controllers attached to the projector and/or sound system adjust the corresponding faulty equipment and a technician can repair or replace a faulty device based upon the measurement values made by the device.

In the method of the present invention, a test pattern with known luminance and chromaticity properties is projected onto a display surface by the projector being tested. Using the device of the present invention, light emitted by a light source such as LEDs is projected through the lens onto the displayed test pattern on the display surface in order to focus the device onto the test pattern appearing on the display surface. Once the device is properly focused on the test pattern on the display surface, the light source is no longer required and is turned off. The light from the projector that reflects off the test pattern then is measured by a color sensor to determine the luminance and chromaticity of the display surface. In a display area that also has equipment for visually and aurally impaired people, the infrared emitter is turned on and an infrared sensor measures the infrared luminance reflected from the display surface to determine whether the assisted listening, visual narrative and/or closed captioning equipment is working properly. Either at the same time as the luminance and/or chromaticity is being measured or at another time during the testing process, a test sound signal may be transmitted through the sound system being used in the display area. The test sound is detected by a microphone in the device of the present invention and then is processed and calibrated by the microcontroller to determine if the sound transmission equipment is working property. In addition, each channel that is part of the sound system can be tested individually by using test sound signals generated by the sound system in each separate channel. The method of the present invention can also determine whether the sound and video signals are properly synchronized. A test pattern and sounds specifically designed to test synchronization of the projection and sound equipment in the display area are played during which the sound and video signal readings are processed in real time to measure any time difference between the two signals to determine if they are in sync. If they are not, adjustments may be made to the video and sound equipment and the test repeated until satisfactory synchronization is achieved.

DETAILED DESCRIPTION OF THE DRAWINGS

Figure 1:
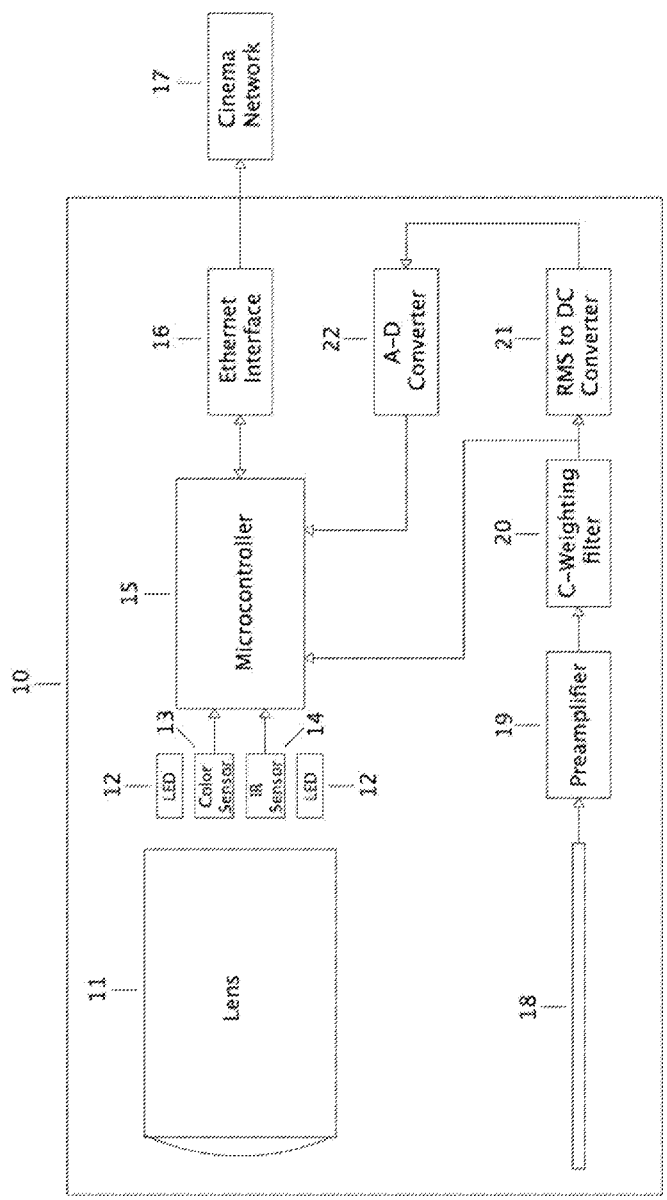
FIG. 1 is a block diagram of one embodiment of the system of the present invention.

Referring first to FIG. 1, the device 10 of the present invention is shown in block diagram. In a preferred embodiment, the device of the present invention can measure the luminance, chromaticity, infrared reflection and sound generated by projection, ADA emitter and sound equipment, respectively, or any combination thereof within a display area. Further, the device 10 of the present invention may be used to determine sound and video synchronization, if desired.

In a preferred embodiment of the present invention, measurements of the luminance, chromaticity, infrared reflection and sound are taken and sent to an operations area where it is determined whether the projection, infrared emitter and/or sound equipment are running properly, are degrading or have failed. As used herein, a display area may be a theater, auditorium, room or any other area in which projection, ADA emitter and/or sound equipment may be used. Likewise, as used herein, a display surface may be a theater screen, an auditorium screen, a wall, an object, an art piece, or any other item or object for which luminance and/or chromaticity measurements might be desired. It is not necessary that all of the features of the device of the present invention be used such that the device may be used just to measure chromaticity or luminance or just sound or just to determine whether an infrared transmitter is operating correctly.

Figure 2:
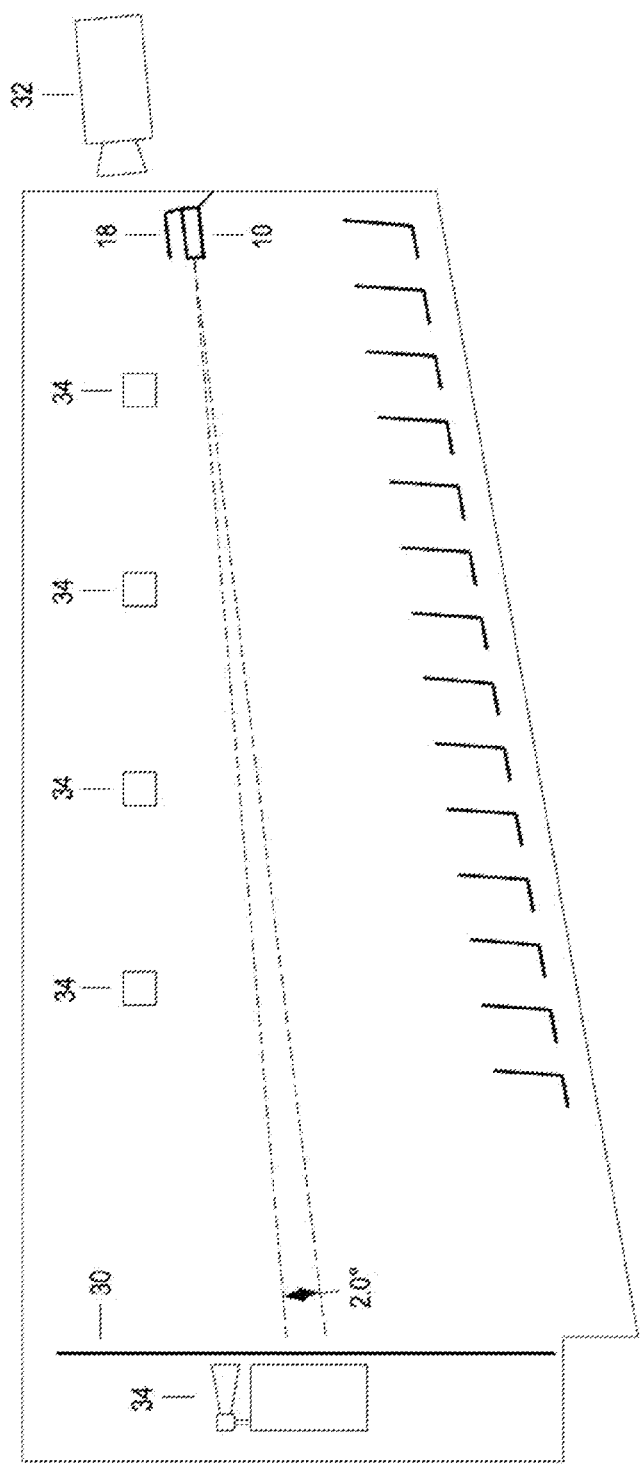
FIG. 2 is a pictorial representation of a theater auditorium showing the device of the present invention mounted in the back of a typical theater.

Referring to FIG. 1, a block diagram representing a preferred embodiment of device 10 of the present invention is shown. The device 10 of the present invention, hereinafter referred to as a light and sound sensor ("LSS"), comprises a lens 11 and at least one high power light source. In a preferred embodiment, the light source is two LEDs 12. However, any strong light source may be used for focus and aim. The light source 12 is focused through the lens 11 onto a display surface, which as shown in FIG. 2, is a cinema screen 30 although, as set forth above, any viewing surface onto which light may be reflected may be used. In the example being disclosed herein, the screen 30 is located within a theater or auditorium such as is shown in the pictorial representation shown in FIG. 2.

In a preferred embodiment where the LSS is being used to detect luminance, chromaticity, infrared reflection and sound, lens 11 is optimized to create a viewing angle which is identical to the viewing angle considered optimal by industry standards such as, but not limited to, SMPTE standard ST0431-2006 (D-Cinema Quality—Screen Luminance Level, Chromaticity and Uniformity). Thus, in a preferred embodiment, lens 11 is focused onto the screen using two LEDs 12 to provide a standard radial viewing cone (which in the preferred embodiment is 2 degrees, although a cone of other sizes may be used) onto a screen 30 from the rear of the theater. In this embodiment, the initial and subsequent measurements taken by the LSS can be confirmed using customary professional test equipment such as the professional photographic spotmeters and the standard SMPTE protocols discussed above. Alternatively, lens 11 may be fabricated to have a focal length suited to the precise viewing angle desired by the theater management.

In a preferred embodiment of the present invention, which is mounted on the back wall of the auditorium where it will not impair the viewing of the screen by an audience, a high focal length lens is used so that it will provide a viewing area on the screen that meets industry standards. However, the optics of the present invention can be fabricated and adjusted so that the LSS may be placed at any other location deemed suitable by theater management so long as it still can focus on the precise area of the screen being tested.

In a preferred embodiment of the present invention, the system also comprises one or more color sensors 13 that monitor the light on the screen (or other object being tested) as it is reflected back through lens 11. In a preferred embodiment, the color sensor 13 comprises a plurality of color filters over a plurality of photodetectors such as, but not limited to, photodiodes, driving analog to digital converters (not shown) which are either integrated into the color sensor or are separate from the color sensor. However, any color sensor, color image sensor or combination of light sensors with appropriate color filters and appropriate analog to digital converters may be used. For example, a color image sensor which extracts X, Y and Z color values from pixels may be used. Also, if the device is intended to measure only the luminance and not chromaticity, a single light sensor with a photopic filter could be used.

A preferred embodiment of the present invention uses a color sensor 13 rather than a broad spectrum light sensor, as a color sensor 13 does not require the use of a photopic filter in front of the sensor for luminance measurements. Using a color sensor also eliminates security concerns as an image sensor usually relays the images being shown on the theater screen 30, which then could be intercepted by unauthorized personnel and lead to piracy of the images on the screen which, at present, is of concern to the cinema industry.

The output of color sensor 13, i.e. the red, green and blue light intensity values, is fed into a microcontroller 15 which runs the values through a color correlation matrix to derive the luminance on the screen 30 with a photopic response. The color correlation matrix is generated by microcontroller 15 during LSS calibration using standard matrix arithmetic (matrix inversion, multiplication, etc.). It is generated by inputting luminance and chromaticity measurements of the display surface that have been taken using professional test equipment within the same display area. The values for the luminance and chromaticity measured by the professional test equipment are entered into the microcontroller either through an automatic calibration program or by manually entering the values on a calibration web page that sends the measurements to the microcontroller. The microcontroller then generates a color correlation matrix which calibrates the LSS. All calibration values are stored in a non-volatile memory attached to or within the microcontroller 15. The test of the equipment may be initiated by the NOC by the sending of an appropriate signal to the microcontroller or alternatively may be initiated at the display site.

The values measured by the LSS are further processed by the microcontroller 15 to generate the x and y chromaticity values along with the X, Y and Z CIE (International Commission on Illumination) tri-stimulus values and luminance (in both foot-Lamberts and candelas per square meter.) Thus, the microcontroller 15 processes the measurements made by the color sensor to send standard chromaticity and luminance values to either a user or to an automatic test program operating on the network represented by block 17 in FIG. 1 via an Ethernet interface 1 for further evaluation. Alternatively if the projection equipment has automatic controllers, the values may be transmitted to the projection equipment controller so that the controller can make any necessary adjustments to the equipment to ensure it is working at optimal values.

A preferred embodiment of the LSS shown in FIG. 1 also comprises an infrared sensor 14 that is located adjacent to the color sensor 13 in the same plane to sense infrared signals reflected off the display surface within the display area which is used to determine whether the infrared emitter located with the display area is working properly. An infrared emitter (not shown), located within the display area, radiates infrared signals towards the screen 30 which are reflected off the screen into the display area. The infrared emitter (not shown) typically has several channels which modulate the infrared light—two audio channels which transmits radio frequency signals, one for hearing impaired patrons and the other for visually impaired patrons, and at least one other data channel which carries closed caption information for the hearing impaired. The LSS 10 measures the infrared radiant power density that is captured by sensor 14 as it is reflected off the display surface 30 to determine whether the infrared emitter is working and whether it is operating at full power.

The infrared sensor 14 also may include an integrated analog to digital converter (not shown), a current to frequency converter (not shown) or a current to voltage converter for easier processing. For example, if the infrared sensor 14 has a frequency output, the microcontroller 15 counts the frequency using an internal counter. If the infrared sensor 14 being used has a voltage output, it drives an analog to digital converter that may be located within the microcontroller. However, the analog digital converter may be located outside of the microcontroller. Regardless of the type of output from the sensor 14, the signal from infrared sensor 14 is fed into microcontroller 15 where the measurements are calibrated so that they are approximately the same as the infrared reflection detected by manual professional testing equipment and then processed for transmission via an Ethernet interface 16 to the NOC 17 or other end location.

In an alternate preferred embodiment, with appropriate filtering, it also would be possible to determine if each of the IR emitter channels are working properly. Specifically, in an alternate preferred embodiment, the infrared sensor and associated processing and analysis circuitry detect and analyze any infrared signals reflected off the surface that are being emitted by an infrared emitter in the venue. The reflected infrared signals are then processed to determine the power density, modulating frequencies, and the characteristics of each modulated signal. The microcontroller then applies appropriate calibration factors to this information and sends it to a user or automatic monitoring equipment to determine if the infrared signal emitter is working properly.

Using a preferred embodiment of the present invention, the sound equipment within the display area may also being tested using audible test signals, such as, but not limited to, pings, pops, tones and noise. In a preferred embodiment, the preferred test signal is pink noise. In a preferred embodiment which is fabricated so that it may also test sound equipment and speaker channels, the LSS also comprises a standard electret microphone 18. However, any low distortion omnidirectional microphone with a flat frequency response may be used. The audio signal detected by microphone 18 drives a preamplifier 19 and a C-weighted filter 20 which is the customary filter used in the cinema industry for sound pressure level (SPL) measurements. However, any other appropriate filters that give the same type of output may be used. The output of filter 20 drives an analog RMS to DC converter 21 which in a preferred embodiment has a long integration time as a long integration times yields stable SPL readings when steady pink noise is present. The RMS to DC converter 21 drives an analog to digital converter 22 which feeds the converted audio signal into microcontroller 15. The microcontroller 15 converts the digitized RMS to DC converter output to decibels and provides an offset that was determined during LSS calibration. Each channel for speakers 34 within the display area may be individually tested by driving each speaker channel with a test signal and then reviewing the calibrated measurements generated by the microcontroller 15.

In a preferred embodiment of the present invention, the microphone 18 protrudes past the lens 11 so that the lens does not distort the omnidirectional characteristics of the microphone. By way of example, and not limitation, sound waves could bounce off the lens 11 and alter the microphone 18 reading.

In a preferred embodiment such as is shown in FIG. 1, the microcontroller measures the DC voltage from the RMS to DC converter 21 using a precision analog to digital converter 22. The common log of the measured DC voltage is calculated and multiplied by 20 (corresponding to a dB calculation for voltage). A calibration offset is then applied to yield an SPL value.

The calibration offset used to compute the final SPL value is calculated by the microcontroller using values obtained during the most recent calibration obtained using standard industry test equipment. Pink noise at a known SPL (typically 85 dB) is presented to the LSS. The measured SPL is sent to the microcontroller (either keyed into a calibration screen or sent by an automatic calibration program). The microcontroller calculates the offset required to convert the raw dB calculation to the measured SPL value.

The LSS also can also measure any time difference between a projected image and its corresponding sound by utilizing special test content as part of routine maintenance or as part of the setup of a display area for a special event such as one that provides a live feed. The content for the audio video synchronization test may comprise a flash on the screen along with a simultaneous audio signal such as a tone burst, ping or pop. When the LSS performs a synchronization test, the analog to digital converters within the color sensor are set to a short integration time, which, in a preferred embodiment, may be 4 ms, to allow fast detection of the flash. The audio output of the C-weighting filter is fed directly to a high speed analog to digital converter within the microcontroller to quickly determine the presence of the audio pop.

During a synchronization test, microcontroller 15 continuously checks for the presence of light or sound values above a certain predetermined threshold. When one or the other occurs, a first "tick time" is recorded by the microcontroller 15. Once a "tick time" for the flash (video) and a tick time for the pop, ping, tone or noise burst (audio) are both recorded, the time difference between the two is calculated. The resulting time different is converted to milliseconds and presented to the user for synchronization evaluation.

In a preferred embodiment of the present invention, all of the components of the system are contained within a single package so that it is easy to install. The system of the present invention may also mounted so as not to interfere with the viewing by the audience of the display surface and in a location where the LSS 10 cannot be easily tampered by unauthorized personnel. In a preferred embodiment, the LSS 10 is mounted at the back of the theater using a mount that allows it to be precisely aimed at the screen 30.

In a preferred method of the present invention, during the initial installation, an image such as a test pattern with known parameters is displayed on the screen. The LEDS 12 on each side of the color sensor 13 are lit and the LSS lens 11 is adjusted so that the light created by LEDs 12 focuses on the test pattern appearing on the screen 30. In a preferred method of the present invention, the LSS position is adjusted so that the LED spots appear in the center of a test pattern on the screen 30. Since the LEDS 12 and color and infrared sensors 13 and 14 are in the same optical plane, any image on the screen will be in focus on the color sensor 13 and the infrared sensor 14. Once focus and aiming is completed, the LEDS are turned off for normal operation. The LEDs 12 are turned on again when a recheck of aim or focus of the LSS 10 is desired. Since the color sensor 13 and the infrared sensor 14 are centered between the LEDs, the color sensor 13 and infrared sensor 14 detect the color and infrared signals, respectively, reflected at the center of the test pattern.

The LSS 10 is initially calibrated either at the factory or at the installation location depending on the preference of the user or manufacturer. The LSS further comprises two calibration screens (not shown) located on the user interface (not shown)—one using foot-Lamberts and the other using candelas per square meter. Initial and subsequent in-place calibrations may be performed by using a professional color meter or the like which is focused upon the same display surface as the LSS 10 which measures x and y values in addition to the luminance values. The values obtained by the color meter are entered into the calibration screens using the reference meter x, y and luminance values when a full screen of red, white and blue are projected. The microcontroller 15 within LSS 10 then generates a color correlation matrix which calibrates the values to determine x, y, X, Y, Z and luminance values.

Similarly, a known IR power density source is used to calibrate the IR sensor. Specifically, the LSS IR sensor is calibrated through the use of a reference meter. The IR power density measured with the reference meter is entered into the microcontroller through either one of the calibration screens. The calibration software in the microcontroller then calculates a scaling factor by which the sensor output value is multiplied by to yield the IR power density sent to the NOC or other end location.

The LSS microphone readings also may be calibrated either at the factory or once it is installed. To calibrate the microphone, a pink noise generator is run at a preselected reference level and the SPL is measured with an audio reference meter at the same location at which the LSS is installed. The value read from the audio reference meter is then entered into the LSS calibration screen. The calibration factor is then saved for later use in SPL measurement calculations.

In a preferred embodiment, the user interface operates entirely over Ethernet. Also in a preferred embodiment, HTTP (hypertext transport protocol), TCP (transport control protocol) and SNMP (simple network management protocol) are utilized. However, any interface techniques may be used to send the same output signals to the NOC or other end location. The HTTP interface allows the LSS measurements to be read using a standard web browser. AJAX (Asynchronous JavaScript and XML) techniques are utilized to update the readings, which in the preferred method of the present invention is approximately every 500 ms. The web interface is also used for system configuration (such as setting IP address, etc.) and for the field calibration, as described above.

The TCP interface is typically used by NOC software that polls the LSS systems to determine the status of an auditorium. The NOC or end user software connects to the LSS using TCP then sends a series of text commands to which the LSS responds with text responses. This simple interface can be adapted to be used in custom programs. The SNMP interface allows the LSS to return its sensed values using standard SNMP get responses. The information available is the same as that available by HTTP or TCP but allows the LSS to be integrated into existing network management systems that rely on SNMP.

While each element of this device is available as a stand-alone product, the LSS combines several elements into one package with optics that allow it to be conveniently mounted on the rear wall of cinemas.

The present invention also comprises a method for repetitively measuring the luminance, chromaticity, sound, and infrared illumination in a theater to detect any changes thereto so that the images being viewed on the screen and the sound in the theater can be kept at their optimal values. Specifically, in a preferred method of the present invention, high power narrow beam LEDS 12 are aimed and focused on a movie screen 30 through an optic lens 11 which is fabricated to ensure an optimal viewing angle which in the preferred method matches professional test instruments. In a preferred method, a specific test pattern with known parameters is projected onto the screen 30. A color sensor 13 measures the luminance levels and/or color quality of the screen test pattern and an infrared sensor 14 measures the infrared levels reflected off the screen 30. In methods where sound measurements are also required, an audio test signal is sent through the theater sound system and measured by the audio sensor 18 (which in the preferred method is a microphone) to determine the SPLs in order to determine if the sound system and the channels corresponding to the speakers 34 which are mounted in the theater are properly working.

If measurement of the synchronization of the video and audio signals is required, the microcontroller 15 captures a first tick timer count when the LSS first senses either the audio or video signal and then captures a second tick time count when the other signal is sensed. The microcontroller 15 then subtracts the two tick count values and converts the time difference to milliseconds. The millisecond time difference, if any, is sent to the user or to a computer to determine whether the value is within acceptable parameters. If not, the synchronization of the audio signal to the video signal can be adjusted either automatically through controllers in the projection and/or sound system or manually by a technician.

Thus, the system and method of the present invention is able to accurately and rapidly measure the luminance, chromaticity, infrared reflection, and sound signals. It is also contemplated that the device of the present invention can be used in outside viewing areas where images are projected onto something other than a screen, such as a blank wall, etc. However, other applications are contemplated such as its use in X-Ray and other medical equipment that uses light, video projection, high intensity light curing systems, semiconductor processing systems, color matching in printing and art lithographs to generate consistent end products, and other equipment in which a light source is focused on an object or surface.

While particular embodiments and techniques of the present invention have been shown and illustrated herein, it will be understood that many changes, substitutions and modifications may be made by those persons skilled in the art. It will be appreciated from the above description of presently preferred embodiments and techniques that other configurations and techniques are possible and within the scope of the present invention. Thus, the present invention is not intended to be limited to the particular embodiments and techniques specifically discussed hereinabove.

What is claimed is:

1. A light and sound sensor system used to measure luminance, chromaticity and sound in a venue where images are projected onto a surface and where audible sound corresponding to the images is being transmitted, comprising:
   a lens;
   at least one high power lighting source for aiming and focusing light through the lens;
   at least one color sensor which can detect luminance and color values reflected off the surface through the lens onto the sensor;
   an omnidirectional microphone which detects the audible sound transmitted within the venue and measures the values thereof; and
   a microcontroller for receiving and calibrating the detected luminance, color and sound values to determine whether they are within an acceptable range.

2. The light and sound sensor system of claim 1 further comprising an infrared sensor and associated processing and analysis circuitry to detect and analyze any infrared signals reflected off the surface that have been emitted by an infrared emitter in the venue, wherein the reflected infrared signals are received by an infrared detector and processed to determine the power density, modulating frequencies, and characteristics of each modulated signal and wherein the microcontroller applies appropriate calibration factors to each processed signal and sends the calibrated signal to the user or computer to determine if the infrared emitter is working properly.

3. The light and sound sensor system of claim 1 wherein the microcontroller also determines any time differences between the sound and light signals in the venue.

4. The light and sound sensor system of claim 1 wherein the microcontroller is capable of communicating through Ethernet or wireless interface.

5. The light and sound sensor system of claim 1 wherein the microcontroller has a color calibration matrix for calibrating the color output values from the sensors so that they correspond to color output values obtained from calibration equipment.

6. The light and sound sensor system of claim 1, further comprising a light source located behind the lens for providing light through the lens onto the surface so that the lens may be aimed on a predetermined location on the surface.

7. A system for measuring sound and for measuring light emitted from a projector as reflected off a particular surface or screen comprising:
a projector for projecting light images onto the surface;
a sound system for transmitting sound;
a lens;
at least one color sensor which can detect the luminance and color values of the projected light images reflected off the particular surface through the lens onto the sensor and measure the characteristics of the projector as reflected by the particular surface;
at least one high power lighting source for emitting additional light through the lens such that the lens and sensors can be aimed and focused on the surface to accurately capture the projector light images reflected from the particular surface;
a microcontroller for receiving, analyzing and calibrating the detected luminance and color values of the projected light images on the particular surface to determine whether they are within an acceptable range, and
an omnidirectional microphone which detects the transmitted sound and measures the values thereof; wherein the microcontroller receives and calibrates the detected sound values to determine whether they are within an acceptable range.

8. The system of claim 7 wherein the microcontroller also determines whether there are any time differences between the light and corresponding sound.

9. The system of claim 7 wherein the microcontroller is capable of communicating through Ethernet or wireless interface.

10. The system of claim 7 wherein an infrared emitter reflects infrared light off of the surface, further comprising, an infrared sensor to detect any infrared signals reflected off the surface, wherein the reflected infrared signals are processed and analyzed to determine the infrared power density, the frequencies of any modulation of the infrared signals, and the contents of the modulated signals, wherein the results of such analysis is transmitted to a user or computer to determine if the infrared signal is proper.

11. A light and sound sensor system for measuring light, sound and infrared light values within a venue having a display surface onto which the light and infrared light are projected and which has a sound system emitting audible sound signals corresponding to the light being projected, comprising:
a lens;
at least one high power light source for aiming and focusing light through the lens;
at least one color sensor which can detect luminance and color values reflected off the surface through the lens onto the color sensor;
an infrared sensor to detect any infrared signals reflected off the surface through the lens onto the sensor;
an omnidirectional microphone which detects the audible sound transmitted within the venue and measures the values thereof; and
a microcontroller for receiving and calibrating the detected luminance, color, infrared and sound values to determine whether they are within an acceptable range.

12. The light and sound sensor system of claim 11 wherein the microcontroller also determines any delays between the light and corresponding sound.

13. The light and sound sensor system of claim 11 further comprising Ethernet communicator connected to the microcontroller.

14. A method for measuring light, sound and infrared light values within a venue having a display surface onto which the light and infrared light are projected and which has a sound system emitting audible sound signals corresponding to the light being projected, comprising the steps of:
displaying a test pattern with known parameters onto the display surface;
focusing a high power light onto the surface to aim and focus a measuring device on the test pattern;
once the measuring device is focused, turning off the high power light;
measuring the projected light reflected off the display surface;
measuring the infrared light reflected off the display surface;
measuring the sound emitted by the sound system;
processing the measured light to determine luminance and chromaticity values;
processing the infrared light to determine infrared light values; and
processing the sound to determine sound pressure levels.

15. The method of claim 14 further comprising the steps of calibrating the luminance, chromaticity, infrared and sound values so as to correspond to values taken by other test equipment used in the same venue using the same parameters.

16. The method of claim 14 further comprising the steps of synchronizing the light reflected off the screen and the sound signals by measuring the time between a flash of light reflected off the display surface and a sound emitted by the sound system, such that the synchronization between the light and sound signals can be determined.

* * * * *